United States Patent
Stamm et al.

(10) Patent No.: US 8,173,302 B2
(45) Date of Patent: May 8, 2012

(54) SULFUR-CARBON MATERIAL

(75) Inventors: Kimber L. Stamm, Ann Arbor, MI (US); Monique N. Richard, Ann Arbor, MI (US); Linda F. Nazar, Waterloo (CA); Xiulei Ji, Oakville (CA); Kyu-Tae Lee, Kitchner (CA)

(73) Assignees: Toyota Motor Engineering & Manufacturing North America, Inc., Erlanger, KY (US); University of Waterloo, Waterloo (CA)

( * ) Notice: Subject to any disclaimer, the term of this patent is extended or adjusted under 35 U.S.C. 154(b) by 1001 days.

(21) Appl. No.: 12/136,846

(22) Filed: Jun. 11, 2008

(65) Prior Publication Data
US 2009/0311604 A1    Dec. 17, 2009

(51) Int. Cl.
*H01M 4/13* (2010.01)
*H01M 4/58* (2010.01)
*H01M 4/64* (2006.01)
*H01M 4/72* (2006.01)
*H01M 4/80* (2006.01)

(52) U.S. Cl. .................. 429/231.8; 429/218.1; 429/233; 429/235

(58) Field of Classification Search .................. None
See application file for complete search history.

(56) References Cited

U.S. PATENT DOCUMENTS

| | | | | |
|---|---|---|---|---|
| 4,356,242 | A * | 10/1982 | Doniat | 429/234 |
| 6,881,234 | B2 * | 4/2005 | Towsley | 29/623.5 |
| 6,908,706 | B2 | 6/2005 | Choi et al. | |
| 7,250,233 | B2 | 7/2007 | Choi et al. | |
| 2002/0192557 | A1 | 12/2002 | Choi et al. | |
| 2003/0113624 | A1 * | 6/2003 | Kim et al. | 429/213 |

FOREIGN PATENT DOCUMENTS

| | | |
|---|---|---|
| JP | 63-062164 | 3/1988 |
| JP | 63062164 A | 3/1988 |
| JP | 9147868 A | 6/1997 |
| JP | 2007-234338 A | 9/2007 |

* cited by examiner

*Primary Examiner* — Emily Le
*Assistant Examiner* — Michael Forrest
(74) *Attorney, Agent, or Firm* — Gifford, Krass, Sprinkle, Anderson & Citkowski, P.C.

(57) ABSTRACT

An electrode material having carbon and sulfur is provided. The carbon is in the form of a porous matrix having nanoporosity and the sulfur is sorbed into the nanoporosity of the carbon matrix. The carbon matrix can have a volume of nanoporosity between 10 and 99%. In addition, the sulfur can occupy between 5 to 99% of the nanoporosity. A portion of the carbon structure that is only partially filled with the sulfur remains vacant allowing electrolyte egress. In some instances, the nanoporosity has nanopores and nanochannels with an average diameter between 1 nanometer and 999 nanometers. The sulfur is sorbed into the nanoporosity using liquid transport or other mechanisms providing a material having intimate contact between the electronically conductive carbon structure and the electroactive sulfur.

16 Claims, 3 Drawing Sheets

Sulfur

Carbon

SULFUR-CARBON MATERIAL

FIELD OF THE INVENTION

The present invention relates to a sulfur electrode, in particular to a sulfur cathode for use in a lithium-ion battery.

BACKGROUND OF THE INVENTION

The demand for newer battery materials having higher energy density, lower toxicity, and lower material cost has led researchers and battery manufacturers to consider lithium-sulfur based systems. The lithium-sulfur chemistry offers a theoretical energy density almost ten times that achieved by current battery systems. Unfortunately, lithium-sulfur batteries have traditionally suffered from low sulfur utilization resulting in a low capacity and severe capacity fade, thereby providing a short lifetime.

Three main approaches to limit capacity loss upon cycling sulfur-based cathodes have been developed. One approach to circumvent capacity fade has been to tether sulfur within a cathode material with an organic molecular chain. This approach attempts to prevent the sulfur from migrating out of the cathode material and becoming electrochemically useless by using the organic molecular chain to attach to the sulfur and/or sulfur-containing species. Such an approach has been investigated and disclosed in U.S. Pat. Nos. 4,833,048; 5,162,175; 5,516,598; 5,529,860; 5,601,947; 6,117,590; and 6,309,778. A second approach to limit the capacity fade of a lithium battery due to sulfur migration from the cathode has been to use an additive to bind polysulfides created within the battery system. This approach has been disclosed in U.S. Pat. Nos. 5,532,077; 6,210,831; and 6,406,814. Materials used for this approach include carbon, silica, metal oxides, transition metal chalcogenides and metals. The third approach has been to use mixed metal chalcogenides containing sulfur as the electrochemically active material within the cathode as disclosed in U.S. Pat. Nos. 6,300,009; 6,319,633; and 6,376,127. However, despite numerous attempts to improve the performance of lithium batteries containing sulfur within the cathode, a significant improvement in cycle life without severely limiting capacity has remained elusive. As such, a sulfur cathode having a relatively high capacity with improved cycle life would be desirable.

SUMMARY OF THE INVENTION

An electrode material having carbon and sulfur is provided. The carbon is in the form of a porous matrix having nanoporosity and the sulfur is sorbed into the nanoporosity of the carbon matrix. The carbon matrix can have a volume of nanoporosity between 10 and 99%. In addition, the sulfur can occupy at least 5% and less than 100% of the nanoporosity. A portion of the carbon structure that is only partially filled with the sulfur remains vacant allowing electrolyte egress. In some instances, the nanoporosity has nanopores and nanochannels with an average diameter between 1 nanometer and 999 nanometers. The sulfur is sorbed into the nanoporosity using liquid transport or other mechanisms providing a material having intimate contact between the electronically conductive carbon structure and the electroactive sulfur. In addition, the sulfur can be present as sulfur and/or lithium-sulfur particles and/or coatings within the nanochannels, and if present as particles, have an outer dimension that is greater than a minimal diameter of the nanoporosity where the particle is located.

DETAILED DESCRIPTION OF THE INVENTION

Figure 1:
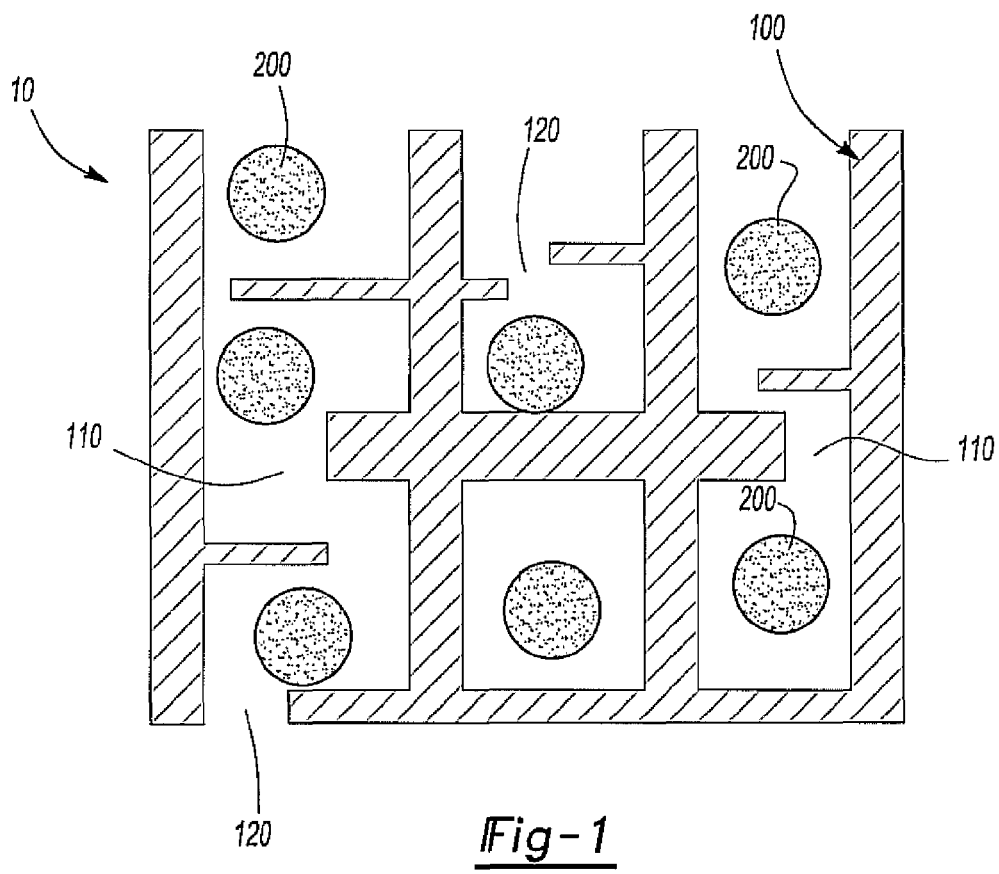
FIG. 1 is a schematic diagram illustrating the structure of an embodiment.

The present invention discloses a sulfur-carbon material for use in an electrochemical device. As such, the sulfur-carbon material has utility as an electro-active material in a battery.

The sulfur-carbon material includes a body containing carbon and sulfur. The carbon is in the form of a high surface area and porous matrix having nanoporosity. For the purposes of the present invention, nanoporosity is defined as porosity within a matrix with pores, passages, channels and the like having an average mean diameter of equal to or less than 999 nanometers. Sulfur, which can be in the form of elemental sulfur and/or a sulfur compound and both of which are referred to as "sulfur" hereafter unless otherwise noted, is sorbed into the nanoporosity of the porous matrix such that the nanoporosity is only partially filled with sulfur and can be present as discrete particles, coatings, and combinations thereof. For the purposes of the present invention, the term sorbed is defined as taken up and held. In addition, the sulfur can partially fill pores and/or passageways within the porous matrix. Only partially filling of the nanoporosity with sulfur affords for the diffusion or migration of an electrolyte through the nanoporosity to reach the sulfur. In contrast, if the nanoporosity were filled with sulfur, migration of the electrolyte to sulfur within the nanoporosity would not be possible.

The porous carbon matrix provides a tortuous and diffusion inhibiting path for any mobile species within the body. As such, during discharging of a lithium-ion battery, any mobile sulfur and/or sulfur-containing species are inhibited from diffusing and/or migrating to the anode of the battery, thereby reducing capacity loss upon the discharge/charge cycling.

In some instances, a coating can be included. In particular, the coating can be applied to the material either before the sulfur is sorbed into the porous carbon matrix or after the sulfur is sorbed into the carbon matrix. In addition, the coating can be an organic coating, illustratively including but not limited to coatings with polyethylene glycol (PEG), polyethylene imide (PEI), polyphenylene vinylene (PPV), polyacrylonitrile (PAN), polyethylene oxide (PEO) and the like, or in the alternative be an inorganic coating such as coatings including Group 15 elements, Group 16 elements and the like. It is appreciated that the coating can be present within the nanoporosity of the porous carbon matrix and on the external surface.

In other instances, a hydrophilic group additive and/or a hydrophobic group additive can be included. The hydrophilic and/or hydrophobic group additive can be included for the purpose of functionalizing the material and impeding sulfur and/or sulfur species from migrating away from the material. Similar to a coating, the hydrophilic and/or hydrophobic group additive can be applied to the material either before the sulfur is sorbed into the porous carbon matrix or after the sulfur is sorbed into the carbon matrix.

Turning now to FIG. 1, an illustrative schematic representing the structure of the sulfur-carbon electrode is shown generally at reference numeral 10. The sulfur-carbon electrode 10 has a carbon matrix 100, the carbon matrix 100 having channels 110 and pores 120. The channels 110 and the pores 120 define a porosity within the carbon matrix 100. It is appreciated that the drawing in FIG. 1 is two-dimensional and that the nanochannel 110 would extend into and out of the plane of the paper. In some instances, the channels 110 are nanochannels and the pores 120 are nanopores, with nanopores and nanochannels defined as pores and channels, respectively, having an average mean diameter equal to or less than 999 nanometers. Average mean diameter is defined as the average of three orthogonal diameter measurements for a pore and the average of two orthogonal diameter measurements for a channel.

The nanochannels and the nanopores can have an average mean diameter between 1 nanometer and 999 nanometers. In some instances, the nanochannels and the nanopores can have an average mean diameter between 1 nanometer and 50 nanometers. In still other instances, the nanochannels and nanopores can have an average mean diameter between 1 nanometer and 30 nanometers. In still yet other instances, the nanochannels and nanopores can have an average mean diameter between 1 nanometer and 20 nanometers. It is appreciated that the schematic shown in FIG. 1 is for illustrative purposes only and that any high surface area carbon structure, such as but not limited to aerogels, xerogels, absorbants, molecular sieves, catalytic supports and the like fall within the scope of the sulfur-carbon electrode disclosed herein.

In some instances a sulfur 200 at least partially within the carbon matrix 100 can be imbibed into the void space of the carbon matrix using any liquid and/or vapor deposition method known to those skilled in the art, illustratively including liquid intrusions from a sulfur melt, solution intrusion, chemical vapor deposition (CVD) methods and physical vapor deposition (PVD) methods. In other instances, the carbon matrix 100 with the sulfur 200 at least partially therein is produced in a single step. Although illustrated in FIG. 1 as discrete particles, this is not required. However, if the sulfur 200 is present as an elemental sulfur particle, the elemental sulfur particle can have an outer dimension that is greater than a minimal diameter of the nanoporosity where the elemental sulfur particle is located. The sulfur 200 can also be present within the carbon matrix 100 as a sulfur compound, for example a lithium-sulfur compound. If the sulfur compound is in the form of a particle, the sulfur compound particle can also have an outer dimension that is greater than a minimal diameter of the nanoporosity where the sulfur compound particle is located. In this manner, in addition to the tortuous path that the sulfur must pass in order to migrate out of the carbon matrix 100, the physical size of elemental sulfur and/or sulfur compound particles is such that migration out of the carbon matrix is decreased compared to heretofor materials, if not totally prevented.

The sulfur can be present as a coating within the channels 110 and/or pores 120, and/or the sulfur 200 can partially fill the channels 110 and/or pores 120. In some instances, the sulfur 200 partially fills the channels 110 and/or pores 120 between 5% and less than 100%. In other instances, the sulfur 200 partially fills the channels 110 and/or pores 120 between 50% and less than 100%, while in still yet other instances between 75% and less than 100%. In yet even other instances, the sulfur 200 partially fills the channels 110 and/or pores 120 between 90% and less than 100%. It is appreciated that the remaining volume, also known as free volume, of the channels 110 and/or pores 120 that is not filled with sulfur can be vacant and allow for electrolyte penetration. Stated differently, after the sulfur 200 partially fills the nanoporosity of the carbon matrix 100, there is free volume available within the channels 110 and pores 120. It is also appreciated that the amount of the sulfur 200 that is present as part of the sulfur-carbon electrode 10 can be varied by the degree or extent of liquid or vapor deposition of the sulfur 200.

Not being bound by theory, imbibing of the sulfur into the void space of the carbon matrix 100 results in a tortuous path that must be traversed before any sulfur and/or sulfur-containing species incorporated within the sulfur-carbon electrode 10 can exit the carbon matrix 100. In the alternative, the carbon matrix 100 provides channels 110 and/or pores 120 having dimensions that prohibit the sulfur 200 and/or sulfur-containing species from exiting. For example, a sulfur 200 particle can be deposited through a pore 120 and within a channel 110 with the resultant particle having a diameter that is too large to exit the channel 110 and/or pore 120. Or for another example, during the discharging of a lithium-type battery the sulfur 200 reacts with lithium to form $Li_xS_y$, and the resultant sulfur-containing species has a diameter or outer physical dimension that is too large to exit the channel 110 and/or pore 120. In addition to providing a tortuous and/or physically difficult path to traverse, the carbon structure 100 provides electronic conductivity necessary when using an insulating species such as sulfur, and remains in close contact with the electrochemically active sulfur.

As will be clear to those skilled in the art, mixing of the sulfur and carbon can be accomplished using a variety of methods, including, but not limited to, ball milling, grinding, melting, evaporation, and/or vacuum treatment. The density of carbon is relatively low such that the addition of up to 30 wt % of carbon to an electrode can still provide useful energy for a battery, as shown in the table below wherein the theoretical energy density for a battery containing $LiCoO_2$ as the active material is compared to a battery having sulfur as the active material with different amounts of carbon added thereto.

TABLE

| Active Material | Active Material (wt %) | Binder (wt %) | Carbon (wt %) | Theoretical energy density (Wh/kg) |
|---|---|---|---|---|
| $LiCoO_2$ | 85 | 5 | 10 | 326 |
| S (100% utilization) | 85 | 5 | 10 | 1205 |
| S (100% utilization) | 65 | 5 | 30 | 921 |
| S (50% utilization) | 65 | 5 | 30 | 543 |
| S (45% utilization) | 50 | 5 | 45 | 418 |

In order to better explain by way of illustration and not by way of limitation, an example of a sulfur-carbon electrode within the scope of the present invention is provided below.

Example

A carbon matrix was prepared as detailed by Jun et al. (J. Am. Chem. Soc. 2000, 122, 10712). Thereafter, a powder containing 30 wt % of the carbon matrix material and 70 wt % of elemental sulfur was hand ground and pressed into pellet form. The pellet was then heated between 120 and 180° C., for example 155° C., such that the sulfur flowed into the void space within the carbon matrix. The carbon-sulfur composite was hand ground and used without further preparation as battery active material. A comparison electrode was prepared using a slurry containing 23 weight percent (wt %) sulfur powder, 10 wt % conductive carbon, 20 wt % binder solution and 46 wt % solvent. The slurry was cast onto an aluminum current collector using the doctor blade method, dried under vacuum and assembled into cells.

Batteries were fabricated using methods known to those skilled in the art and tested in a typical constant current profile.

Figure 2:
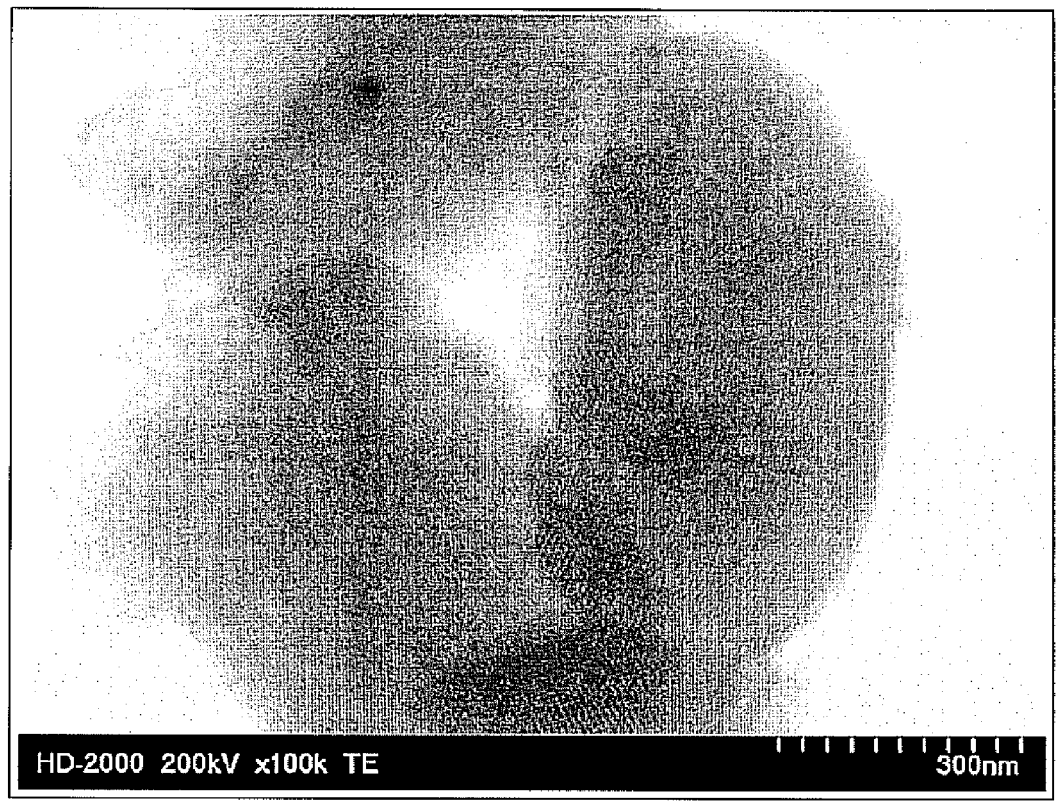
FIG. 2 is a transmission electron microscopy digital image of an embodiment of the present invention.
Figure 3:
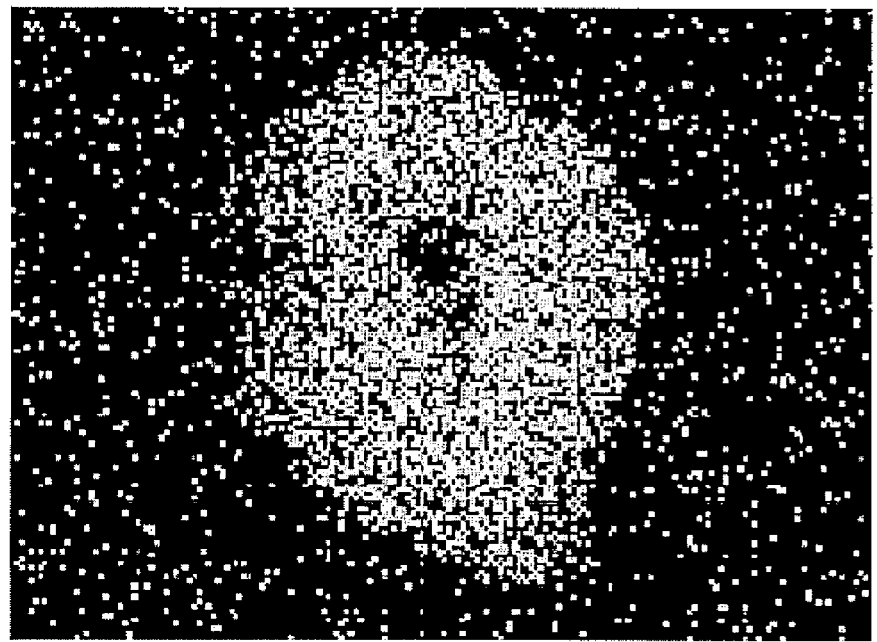
FIG. 3 is an energy dispersive spectroscopy map showing the presence of sulfur and carbon for an embodiment of the present invention.
Figure 3:
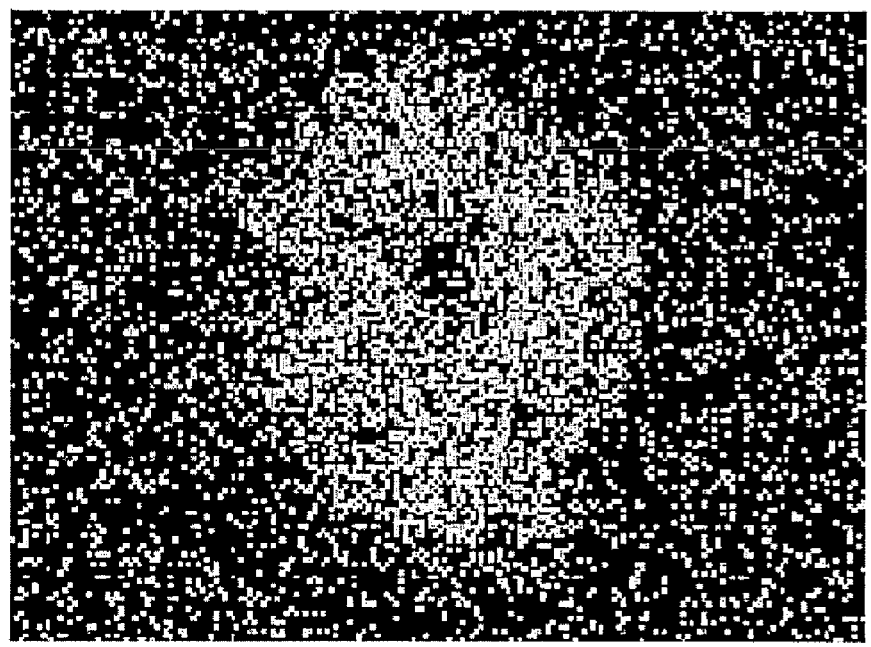

FIG. 2 shows a transmission electron microscopy (TEM) micrograph of a portion of the sulfur-carbon electrode. As illustrated in this micrograph, sulfur containing nanochannels visible as generally parallel lines of darker intensity than the surrounding material can be seen at various locations. FIG. 3 illustrates an energy dispersive spectroscopy (EDS) mapping of the material shown in FIG. 2, wherein the presence of sulfur within the carbon matrix is shown. As illustrated in this figure, the sulfur is occupying void space within the carbon structure.

Figure 4:
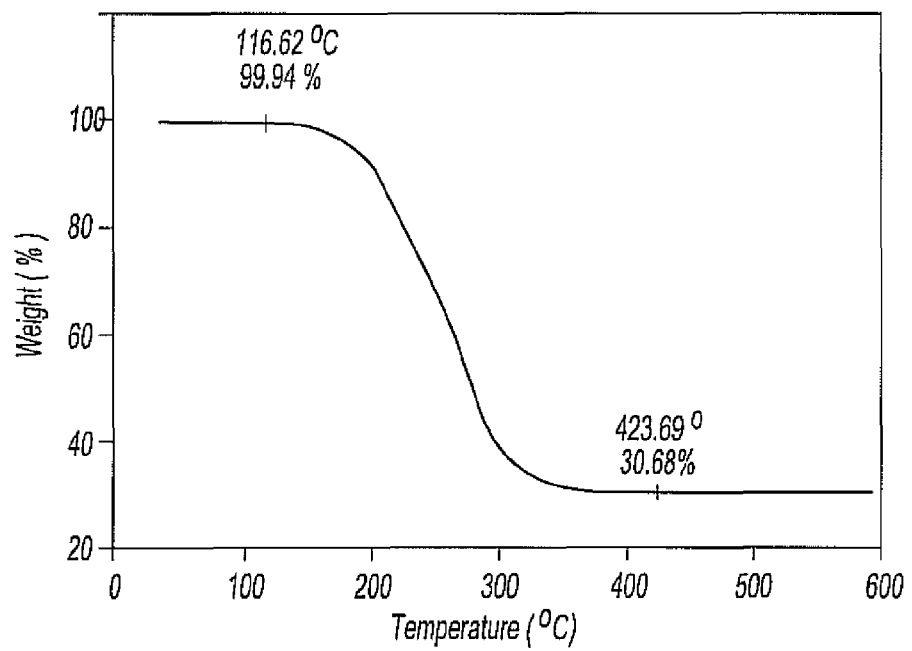
FIG. 4 is a thermogravimetric analysis plot showing sulfur mass loss from an embodiment of the present invention.

After production of the sulfur-carbon electrode material, thermogravimetric analysis (TGA) was performed, with the results shown in FIG. 4. As illustrated in this figure, approximately 70 wt % of the material can be attributed to sulfur.

Figure 5:
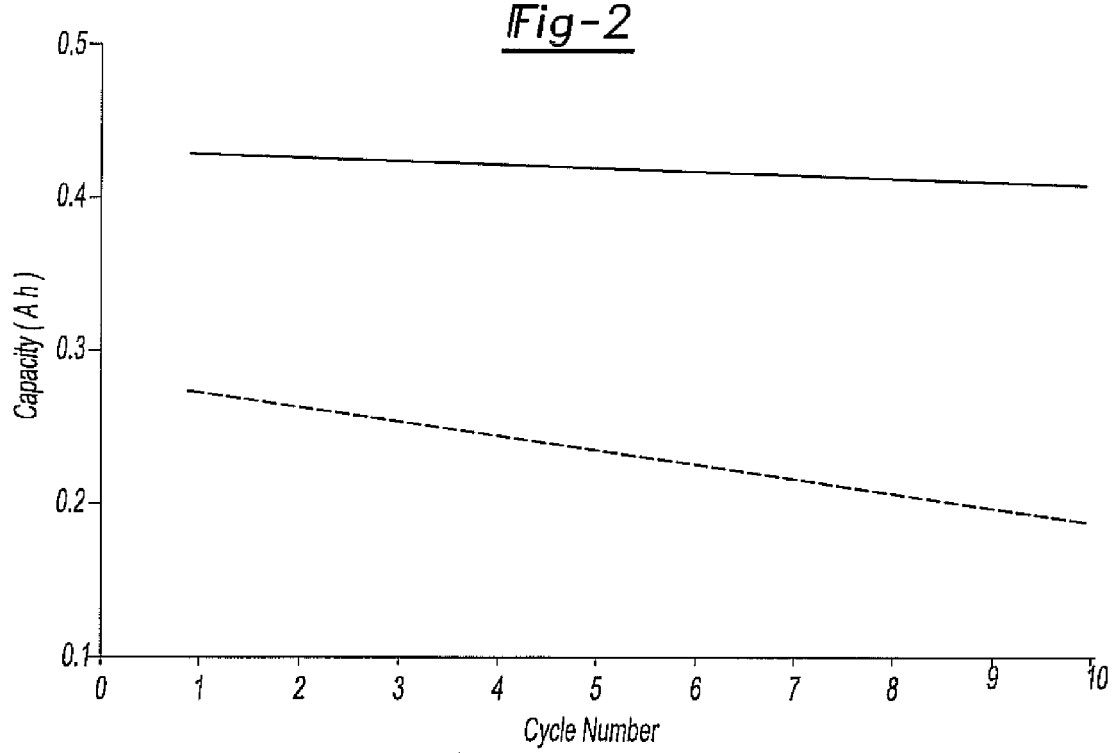
FIG. 5 is a plot showing the capacity as a function of cycle number for an embodiment of the present invention.

The sulfur-carbon material illustrated in FIGS. 2 and 3 was also tested against the comparison electrode mentioned above. The results of this testing are shown in FIG. 5 where the high capacity as a function of cycle number for the sulfur-carbon electrode material disclosed herein is demonstrated by the solid line when compared with the comparison electrode shown by the dotted line. In particular, the capacity of the sulfur-carbon material shown in FIGS. 2 and 3 has a higher initial capacity than the comparison electrode, with the higher capacity maintained throughout the test cycles. As such, the sulfur-carbon material produced by depositing sulfur within the void space of a porous and high surface area carbon matrix provides increased capacity and reduced capacity loss as a function of cycles compared to The comparison electrode.

While the invention has been described in detail and with reference to a specific example, it is appreciated that various changes and modifications can be made without departing from the spirit and scope thereof.

We claim:

1. A material comprising:
carbon and sulfur;
said carbon in the form of a porous matrix having nanoporosity in the form of nanopores and nanochannels having an average diameter between 1 nanometer and 50 nanometers; and
said sulfur sorbed into a portion of said nanoporosity of said carbon matrix and in the form of nanoparticles having an external dimension that is greater than a minimal diameter of said nanoporosity where said nanoparticles are located such that said nanoparticles are trapped within said carbon matrix;
said sulfur occupying more than 5% and less than 100% said nanoporosity such that there is free volume available within said nanoporosity.

2. The material of claim 1, wherein said matrix has between 10 and 99 percent by volume of said nanoporosity.

3. The material of claim 2, wherein said sulfur occupies more than 50% and less than 100% said nanoporosity.

4. The material of claim 2, wherein said sulfur occupies more than 75% and less than 100% said nanoporosity.

5. The material of claim 1, further comprising a coating, said coating selected from the group consisting of organic and inorganic components.

6. The material of claim 1, wherein at least part of said sulfur is an elemental sulfur particle.

7. The material of claim 1, wherein at least part of said sulfur compound is a sulfur compound particle.

8. The material of claim 1, wherein said nanopores and said nanochannels have an average diameter between 1 nanometer and 30 nanometers.

9. The material of claim 1, wherein said nanopores and said nanochannels have an average diameter between 1 nanometer and 20 nanometers.

10. An electrode comprising the material according to claim 1.

11. The electrode of claim 10, further comprising a binding compound, other additives and combinations thereof.

12. A battery having:
a negative electrode;
an electrolyte; and
a positive electrode according to claim 10.

13. A material comprising:
carbon and sulfur;
said carbon in the form of a porous matrix in the form of nanopores and nanochannels defining a porosity, said nanopores and said nanochannels having an average diameter between 1 nanometer and 50 nanometers; and
said sulfur sorbed into a portion of said nanopores and said nanochannels of said carbon matrix in the form of nanoparticles having an external dimension that is greater than a minimal diameter of said nanoporosity where said nanoparticles are located such that said nanoparticles are trapped within said porous matrix and occupy more than 5% and less than 100% of said porosity such that there is free volume available within said porosity.

14. The material of claim 13, wherein at least part of said sulfur is an elemental sulfur particle.

15. The material of claim 13, wherein said at least part of said sulfur is present as a sulfur compound particle.

16. A battery having a sulfur-carbon electrode, the battery comprising:
a negative electrode containing lithium;
an electrolyte;
a positive electrode, said positive electrode having:
a porous carbon matrix having nanopores and nanochannels defining a porosity, said nanopores and said nanochannels having an average diameter between 1 nanometer and 50 nanometers; and
sulfur sorbed into a portion of said nanopores and said nanochannels of said carbon matrix in the form of nanoparticles having an external dimension that is greater than a minimal diameter of said nanoporosity where said nanoparticles are located such that said nanoparticles are trapped within said porous matrix and occupy more than 5% and less than 100% of said porosity such that there is free volume available within said porosity.

* * * * *